(12) United States Patent
Wright

(10) Patent No.: US 7,704,309 B2
(45) Date of Patent: Apr. 27, 2010

(54) DISAZODYES FOR INK-JET PRINTING

(75) Inventor: Gavin Wright, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 305 days.

(21) Appl. No.: 11/886,959

(22) PCT Filed: Mar. 27, 2006

(86) PCT No.: PCT/GB2006/001127

§ 371 (c)(1), (2), (4) Date: Sep. 24, 2007

(87) PCT Pub. No.: WO2006/103414

PCT Pub. Date: Oct. 5, 2006

(65) Prior Publication Data

US 2009/0068414 A1    Mar. 12, 2009

(30) Foreign Application Priority Data

| Mar. 31, 2005 | (GB) | ................................. | 0506495.1 |
| Jul. 30, 2005 | (GB) | ................................. | 0515761.5 |
| Oct. 12, 2005 | (GB) | ................................. | 0520690.9 |

(51) Int. Cl.
  C09D 11/02 (2006.01)
  C09B 33/02 (2006.01)
  B41J 2/01 (2006.01)

(52) U.S. Cl. .................... 106/31.48; 534/797; 347/100

(58) Field of Classification Search ............. 106/31.48; 534/797; 347/100
See application file for complete search history.

(56) References Cited

U.S. PATENT DOCUMENTS

| 4,542,208 A | 9/1985 | Odani et al. ................. 534/797 |
| 4,661,158 A * | 4/1987 | Kobayashi et al. ....... 106/31.48 |
| 5,006,128 A * | 4/1991 | Pedrazzi ..................... 534/797 |
| 5,268,459 A | 12/1993 | Gregory et al. ............. 534/758 |
| 5,374,301 A | 12/1994 | Gregory et al. .......... 106/31.48 |
| 5,451,251 A * | 9/1995 | Mafune et al. ........... 106/31.48 |
| 5,534,052 A | 7/1996 | Mennicke et al. ........ 106/31.43 |
| 5,644,040 A | 7/1997 | Hurter ........................ 534/635 |
| 5,728,201 A * | 3/1998 | Saito et al. ............... 106/31.48 |
| 6,277,185 B1 | 8/2001 | Watson et al. ............ 106/31.48 |
| 6,290,763 B1 | 9/2001 | Millard et al. ........... 106/31.48 |
| 6,605,144 B1 * | 8/2003 | Watkinson et al. ....... 106/31.48 |
| 6,767,394 B2 * | 7/2004 | Shawcross et al. ....... 106/31.48 |
| 6,844,428 B2 * | 1/2005 | Hasemann et al. .......... 534/797 |
| 7,150,783 B2 * | 12/2006 | Oshaughnessy et al. .. 106/31.48 |
| 7,163,576 B2 | 1/2007 | Oshaughnessy et al. .. 106/31.48 |
| 2004/0068102 A1 | 4/2004 | Holloway et al. ........... 534/632 |
| 2006/0032399 A1 | 2/2006 | Oshaughnessy et al. .. 106/31.48 |
| 2009/0053479 A1 * | 2/2009 | Wright ........................ 534/797 |

FOREIGN PATENT DOCUMENTS

| DE | 60 828 | 3/1968 |
| DE | 60828 A | 3/1968 |
| DE | 208166 A1 | 3/1984 |
| DE | 33 37 799 | 4/1984 |
| DE | 236 327 | 6/1986 |
| DE | 236327 A1 | 6/1986 |
| DE | 272833 | 10/1989 |
| EP | 0 657 509 | 6/1995 |
| EP | 0 714 955 | 6/1996 |
| GB | 1 525 280 | 9/1978 |
| GB | 1525280 | 9/1978 |
| GB | 2 159 829 | 12/1985 |
| GB | 2159829 A | 12/1985 |
| JP | 61 190561 | 8/1986 |
| JP | 61-190561 | 8/1986 |
| JP | 62-132969 | 6/1987 |
| JP | 62 132969 | 6/1987 |
| JP | 62-250059 | 10/1987 |
| JP | 62 250059 | 10/1987 |
| JP | 11 209643 | 8/1999 |
| JP | 11-209643 A | 8/1999 |

* cited by examiner

*Primary Examiner*—Helene Klemanski
(74) *Attorney, Agent, or Firm*—Morgan Lewis & Bockius LLP

(57) ABSTRACT

A process for printing an image on a substrate comprising applying to the substrate by means of an ink jet printer an ink comprising a compound of Formula (1) or salt thereof:

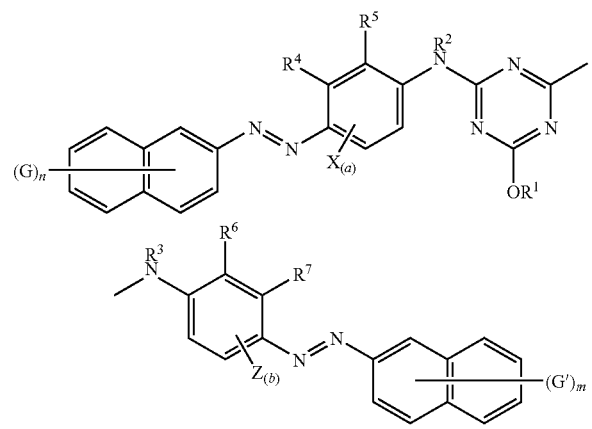

Formula (1)

Also claimed are compounds, inks, printed substrates and the use of compounds in preparing ink jet printing inks. The compounds provide inks which when printed exhibit good light fastness and ozone fastness.

24 Claims, No Drawings

DISAZODYES FOR INK-JET PRINTING

This invention relates to compounds suitable for use as dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness, ozone-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate that could block the fine nozzle.

JP 11209643 describes yellow dye blends and their use in the coloration of cellulose fibres.

It has now surprisingly been found that certain compounds provide inks which perform particularly well as ink jet printer inks.

According to a first aspect of the present invention there is provided a process for printing an image on a substrate comprising applying to the substrate by means of an ink jet printer an ink comprising a compound of Formula (1) and salts thereof:

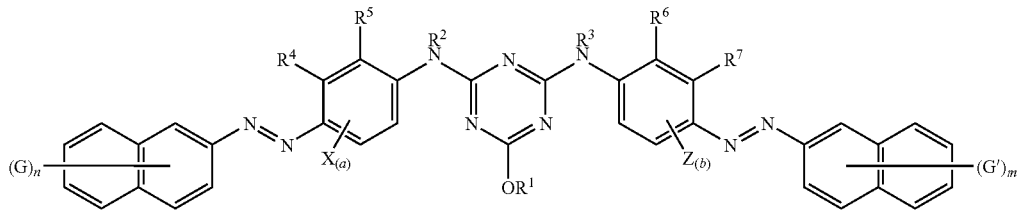

Formula (1)

wherein:
$R^4$, $R^5$, $R^6$ and $R^7$ are each independently H or an optionally substituted substituent or $R^4$ and $R^5$ and/or $R^6$ and $R^7$ together with the carbon atoms to which they are attached form an optionally substituted aryl or heterocyclic ring;

X and Z are each independently H or an optionally substituted substituent;

$R^1$ is H or optionally substituted $C_{1-4}$-alkyl;

$R^2$ and $R^3$ are each independently H, $C_{1-4}$-alkyl, —$CONR^8R^9$, —$SO_2NR^8R^9$ or aryl groups; wherein $R^8$ and $R^9$ are each independently H, optionally substituted $C_{1-8}$-alkyl, an optionally substituted aryl or heterocyclic ring, or $R^8$ and $R^9$ together with the nitrogen atom to which they are attached form an optionally substituted 5- or 6-membered ring;

G and G' are each independently a sulfonic acid group, carboxylic acid group or phosphonic acid group;

n and m are each independently 0, 1, 2, 3, 4 or 5; and a and b are each independently 0, 1 or 2.

Preferably X and Z are each independently H, or optionally substituted alkyl, optionally substituted alkoxy, optionally substituted aryl, optionally substituted heterocyclic, —$NR^8R^9$, —$NHCOR^8$, —$NHCONR^8R^9$, —$C(O)R^8$, —$C(O)OR^8$, —$C(O)NR^8R^9$, —$PO_3H_2$, —$SR^8$, —$SO_2R^8$, —$SO_2NR^8R^9$, —$SOR^8$, —$SO_3H$, —$CF_3$, —$CN$, —$NO_2$, hydroxy or halogen, wherein $R^8$ and $R^9$ are each independently H, optionally substituted $C_{1-8}$-alkyl, optionally substituted aryl (for example phenyl), optionally substituted heterocyclic, or $R^8$ and $R^9$ together with the nitrogen atom to which they are attached form an optionally substituted 5 or 6 membered ring (for example piperidine, pyrrolidone, pyridine, piperizine or morpholine).

Preferably $R^4$, $R^5$, $R^6$ and $R^7$ are as described above for X and Z, or $R^4$ and $R^5$ and/or $R^6$ and $R^7$ together with the carbon atoms to which they are attached form an optionally substituted 5- or 6-membered aryl or heterocyclic ring (for example phenyl, pyridine, pyrrole, imidazole, thiazole, pyrazine, piperidine or pyrrolidone).

When $R^4$, $R^5$, $R^6$, $R^7$, X or Z is an optionally substituted alkyl it is preferably optionally substituted $C_{1-4}$-alkyl, more preferably $C_{1-4}$alkyl, for example methyl, ethyl, propyl, isopropyl, butyl, sec-butyl, optionally substituted with for example hydroxy, halogen, carboxy or sulfo groups. Examples include, but are not limited to, trifluoromethyl, hydroxyethyl, sulfopropyl and carboxyethyl.

When $R^4$, $R^5$, $R^6$, $R^7$, X or Z is an optionally substituted alkoxy it is preferably optionally substituted $C_{1-4}$-alkoxy more preferably $C_{1-4}$-alkoxy for example, methoxy, ethoxy, propoxy, isopropoxy, butoxy, optionally substituted with for example hydroxy, halogen or carboxy groups. Examples include, but are not limited to, carboxypropyloxy, carboxyethoxy, hydroxyethoxy or chloroethoxy.

When $R^4$, $R^5$, $R^6$, $R^7$, X or Z is an optionally substituted aryl group it is preferably optionally substituted phenyl. Optional substituents on the aryl ring include for example $C_{1-8}$-alkyl, $C_{1-8}$-alkoxy, —$NR^8R^9$, —$NHCOR^8$, —$NHCONR^8R^9$, —$C(O)R^8$, —$C(O)OR^8$, —$C(O)NR^8R^9$, —$PO_3H_2$, —$SR^8$, —$SO_2R^8$, —$SO_2NR^8R^9$, —$SOR^8$, —$SO_3H$, —$CF_3$, —$CN$, —$NO_2$, hydroxy or halogen, wherein $R^8$ and $R^9$ are as described previously above. Examples include, but are not limited to, carboxyphenyl, sulfophenyl, nitrophenyl and chlorophenyl.

When $R^4$, $R^5$, $R^6$, $R^7$, X or Z is an optionally substituted heterocyclic group it is preferably either an optionally substituted aliphatic heterocyclic group or an optionally substituted aromatic heterocyclic group, for example optionally substituted thiophene, pyrazole, triazole, thiadiazole, thiazole, imidazole, pyridine, pyrrolidone, piperizine, morpholine or pyrimidine. Optional substituents on the heterocyclic ring include for example $C_{1-8}$-alkyl, —$NR^8R^9$, —$NHCOR^8$, —$NHCONR^8R^9$, —$C(O)OR^8$, —$C(O)NR^8R^9$, —$SR^8$, —$SO_2R^8$, —$SO_2NR^8R^9$, —$SOR^8$, —$SO_3H$, —$CF_3$, —$CN$, —$NO_2$, hydroxy or halogen, wherein $R^8$ and $R^9$ are as previously described above. Examples include, but are not limited to, carboxytriazole, chloropyridyl and cyanothiophene.

It will be appreciated that in the compounds of Formula (1), $R^4$, $R^5$, $R^6$, $R^7$, X and Z may be each independently the same or different. In one embodiment $R^4$, $R^5$, $R^6$, $R^7$, X and Z are each independently H, optionally substituted $C_1$ alkyl (preferably methyl or ethyl), optionally substituted $C_{1-4}$-alkoxy (preferably methoxy or ethoxy), —$SO_2NR^8R^9$ or —$NHCONR^8R^9$ wherein $R^8$ and $R^9$ are as described above, but more preferably $R^8$ is H and $R^9$ is H, optionally substituted $C_{1-4}$-alkyl (preferably methyl or ethyl) or aryl (preferably phenyl).

Preferably however, $R^4$, $R^5$, $R^6$, $R^7$, X and Z are each independently H, $C_{1-4}$-alkyl, $C_{1-4}$-alkoxy, a carboxylic acid, group or $NHCONH_2$.

More preferably, $R^4$, $R^5$, $R^6$, $R^7$, X and Z are each independently H, $C_{1-4}$-alkyl or a carboxylic acid.

In one embodiment $R^5$ and/or $R^6$ is a carboxylic acid group. Compounds according to this embodiment have particularly good solubility, light fastness and ozone fastness.

The compounds of Formula (1) may symmetrical or asymmetrical.

Thus, taking account of the above preferences, a preferred compound is a compound of Formula (1) or salt thereof wherein:

$R^4$, $R^5$, $R^6$ and $R^7$ are each independently H, $C_{1-4}$-alkyl, $C_{1-4}$-alkoxy, carboxylic acid or $NHCONH_2$;

$R^1$ is H or $C_{1-4}$-alkyl;

$R^2$ and $R^3$ are each independently H or $C_{1-4}$-alkyl;

G and G' are each independently a sulfonic acid group, carboxylic acid group or phosphonic acid group;

n and m are each independently 1, 2 or 3; and a and b are zero.

In a particularly preferred embodiment the compound of Formula (1) is of Formula (2) or a salt thereof:

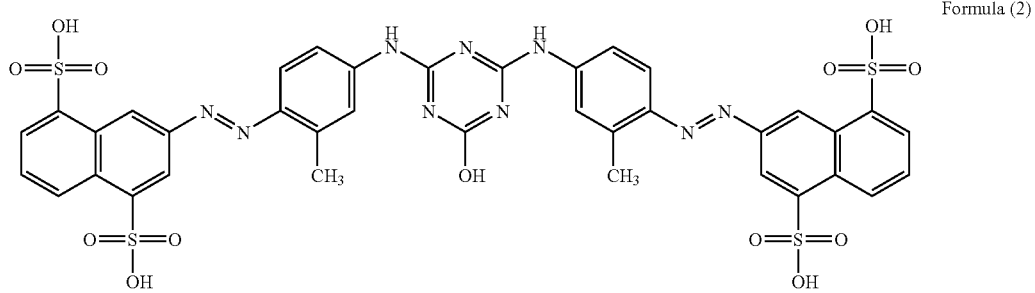

Formula (2)

$R^2$ and $R^3$ are each most preferably H.

$R^1$ may be optionally substituted with for example $C_{1-8}$-alkyl, $C_{1-8}$-alkoxy, —$NR^8R^9$, —$NHCOR^8$, —$NHCONR^8R^9$, —$C(O)R^8$, —$C(O)OR^8$, —$C(O)NR^8R^9$, —$PO_3H_2$, —$SR^8$, —$SO_2R^8$, —$SO_2NR^8R^9$, —$SOR^8$, —$SO_3H$, —$CF_3$, —CN, —$NO_2$, hydroxy or halogen, wherein $R^8$ and $R^9$ are as described previously above. More preferably $R^1$ is unsubstituted.

$R^1$ is most preferably H, as this provides compounds having particularly good ozone and light fastness.

Preferably both n and m are not zero because this improves the solubility of the compound of Formula (1) in aqueous liquid media.

In one embodiment the groups represented by $(G)_m$ and $(G')_n$ are identical and in another embodiment they are not identical.

It is most preferred that G and G' are each a sulfonic acid group.

It is preferred that n and m are each independently 1, 2 or 3 most preferably 2 or 3. Preferably the compound of Formula (1) has from 2 to 6, more preferably from 4 to 6 sulfonic acid groups.

It is preferred that a and b are each independently 0 or 1.

It is preferred that one or more groups represented by $R^4$, $R^5$, $R^6$ and $R^7$ is H.

In one embodiment the groups represented by $(X)_a$ and $(Z)_b$ are identical and in another embodiment they are not identical.

$R^2$ and $R^3$ may be the same or different.

$R^4$ and $R^7$ may be the same or different.

$R^5$ and $R^6$ may be the same or different.

It is especially preferred that the compounds of Formula (1) are yellow, orange or brown in colour. More preferably dilute inks comprising the compounds of Formula (1) are yellow in colour. The compounds of the present invention exhibit particularly good ozone fastness, light fastness and optical density, making them especially suitable as colorants for photo-realistic and other ink jet printing applications providing bright yellow ink jet prints.

The compounds of Formula (1) also have good solubility in an ink jet printing ink and good operability in ink jet printers. Inks comprising compounds of Formula (1) demonstrate a low tendency to crust over or block nozzles when printed from an ink jet printer.

Compounds of Formula (1) are preferably free from fibre reactive groups because no such groups tend to impair long term printer operability. The term fibre reactive group is well known in the art and is described for example in EP 0356014 A1. Fibre reactive groups are capable, under suitable conditions, of reacting with the hydroxy groups present in, for example, cellulosic fibres or with the amino groups present in, for example, natural fibres to form a covalent linkage between the fibre and the dye.

The compounds of Formula (1) are suitable for use as dyes for ink jet printing and may be prepared by, for example, the hydrolysis of the monochloro triazinyl dye of Formula (3). Preferably, the hydrolysis is performed in alkali solution utilising sodium or lithium hydroxide as the base at 60-80° C. for 4-10 hours.

Formula (3)

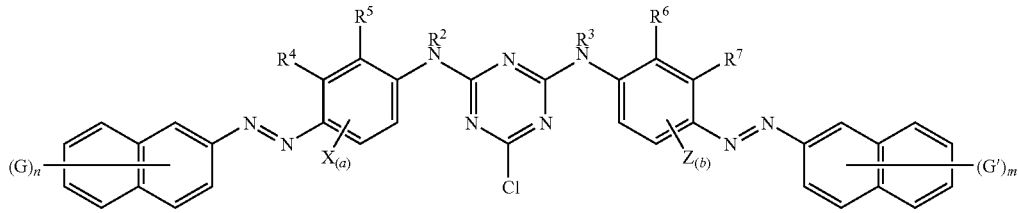

The compounds of Formula (3) may be prepared, for example, by the condensation of 1 mole of Formula (4a) and 1 mole of Formula (4b) with 1 mole of cyanuric chloride, or to achieve a symmetrical molecule 2 moles of the monoazo compound of either Formula (4a) or (4b) with 1 mole of cyanuric chloride. The condensation is preferably performed in aqueous solution at 0 to 40° C. and pH 5 to 7.

Formula (4a)

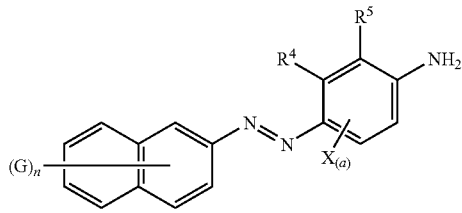

Formula (4b)

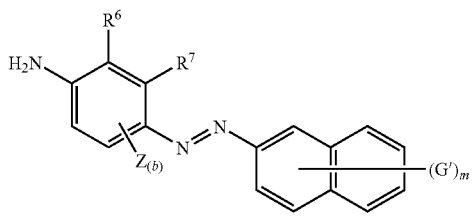

The compounds of Formulae (4a) and (4b) may be prepared by, for example, diazotising a compound of the Formula (5a) or (5b) to give a diazonium salt and coupling the resultant diazonium salt with a compound of Formula (6a) or Formula (6b) respectively:

Formula (5a)

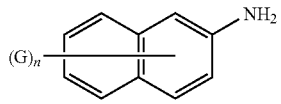

Formula (5b)

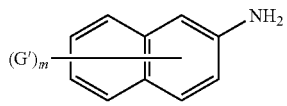

Formula (6a)

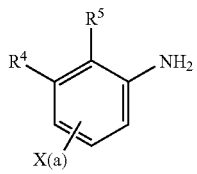

-continued

Formula (6b)

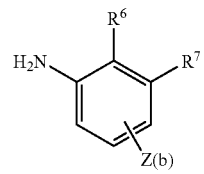

wherein:
G, G', X, Z, $R^4$, $R^5$, $R^6$, $R^7$, n, m, a and b are as hereinbefore defined in relation to Formula (1).

The diazotisation is preferably performed at a temperature below 20° C., more preferably at a temperature from 0° C. to 5° C. Preferably, the diazotisation is performed in water, preferably at a pH below 7. Dilute mineral acid, e.g. HCl or $H_2SO_4$ or an organic acid (for example acetic acid, propionic acid) or a mixture thereof may be used to achieve the desired acidic conditions.

The compounds of Formula (1) may be in the free acid or salt form. Preferred salts are water-soluble, for example alkali metal salts, (especially lithium, sodium, potassium), ammonium, substituted ammonium and mixed salts thereof. Preferred metal salts are those with sodium and lithium.

Preferred ammonium and substituted alkyl ammonium salts have cations of the formula $^+NV_4$ wherein each V independently is H or optionally substituted alkyl, or two groups represented by V are H or optionally substituted alkyl and the remaining two groups represented by V, together with the N atom to which they are attached, form a 5- or 6-membered ring Preferably each V independently is H or $C_{1-4}$-alkyl, more preferably H, $CH_3$ or $CH_2CH_3$, especially H.

Preferred cyclic cations comprise a morpholinyl, pyridinyl pr piperidinyl ring.

Examples of cations include $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $(CH_3)_2CHN^+H_3$, $N^+(CH_3)_4$, $N^+(CH_2CH_3)_4$, N-methylpyridinium, N,N-dimethyl piperidinium and N,N-dimethyl morpholinium.

It is especially preferred that the compounds of Formula (1) according to the present invention are in the form of a sodium, lithium, potassium, ammonium, substituted ammonium salt or mixtures thereof.

The compounds of Formula (1) may be converted into a salt using known techniques. For example, an alkali metal salt of a compound may be converted into a salt with ammonia or an amine by dissolving an alkali metal salt of the compound in water acidifying with a mineral acid and collecting the precipitated free acid by filtration. The isolated solid is then dissolved in water and the pH of the solution adjusted to pH 9 to 9.5 with ammonia or the amine. The alkali metal cations are then removed by dialysis. The desired salt form may also be prepared by dissolving an alkali metal salt of the compound of Formula (1) in water and passing the solution through a column of a suitably modified ion exchange resin.

The compounds of Formula (1) are preferably dyes, more preferably water-soluble dyes.

The compounds of Formula (1) may exist in tautomeric forms other than those shown in this specification. These tautomers are also included within the scope of the present invention.

According to a second aspect of the present invention there is provided a compound of Formula (1) or salt thereof with the proviso that the compound of Formula (1) is not of the Formula A, B or C:

any of the groups represented by $R^4$, $R^5$, $R^6$, $R^7$, X and Z is optionally substituted alkoxy it is preferably optionally substituted $C_{2-4}$-alkoxy.

The compounds of Formula A, B and C exist in tautomeric forms other than those shown in this specification and such tautomeric forms are included within the scope of the formulae as drawn herein. That is to say, the proviso also excludes the tautomers of compounds of Formula A, B and C.

The compounds of Formula (1) may be used as the sole colorant in inks because many such compounds have the desired yellow or orange shade. However, if desired, one may prepare a colorant mixture by mixing the compounds of Formula (1) or salt thereof with one or more colorants other than a compound of Formula (1) or salt thereof (hereinafter further

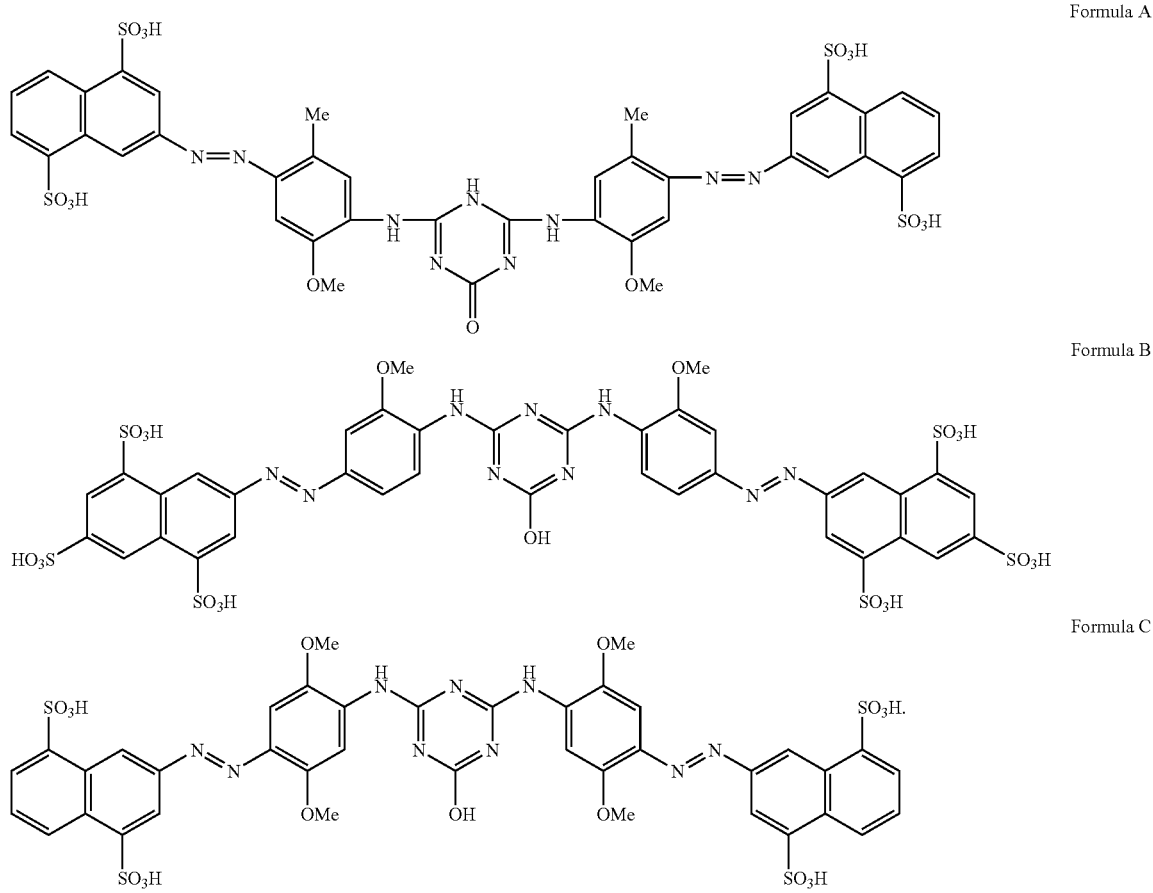

Formula A

Formula B

Formula C

As is well known in the art, Me means methyl.

The preferred compounds of Formula (1) are as described above in relation to the process of the present invention.

In a further embodiment according to the second aspect of the present invention $R^5$ and $R^6$ are not both methoxy. More preferably, two out of the three groups represented by $R^4$, $R^5$ and X are not methoxy groups and two out of the three groups represented by $R^6$, $R^7$ and Z are not methoxy groups. It is particularly preferred that none of the groups represented by $R^4$, $R^5$, $R^6$, $R^7$, X and Z is a methoxy group. In the compounds according to the second aspect of the present invention when colorants). Colorant mixtures are particularly useful if a slightly different shade is required for a particular end use.

A preferred colorant mixture comprises;

a) two or more compounds of Formula (1) or salts thereof; or b) one or more compounds of Formula (1) or a salt thereof and one or more further colorants.

Preferably, the compound of Formula (1) or salt thereof present in the colorant mixture is as defined in the second aspect of the present invention, more preferably the compound of Formula (1) is of Formula (2) as hereinbefore defined.

Preferably, the colorant mixture is mixed so as to provide a uniform colour.

The further colorants, may comprise for example pigments and/or dyes.

Suitable further colorants are listed in the Colour Index International.

The amounts of the compound of Formula (1) and further colorant(s) present in the colorant mixture may be selected so as to adjust the shade as desired.

When further colorants are included in the ink these are preferably selected from yellow, magenta, cyan and black colorants and combinations thereof, most preferably yellow or magenta colorants and combinations thereof.

Suitable further colorants include, for example, yellow pigments, for example, C.I. Pigment Yellow 55, 74, 93, 109, 110, 128, 138, 150, 151, 154, 155, 180 and 185; yellow dyes, for example, C.I. Acid Yellow 17, 19, 23, 25, 32, 40, 42, 44, 49, 61, 127, 151, 199, 219; C.I. Direct Yellow 8, 11, 12, 27, 28, 29, 44, 50, 85, 86, 96, 100, 106, 132, 142, 144, 173, the yellow dyes disclosed in granted U.S. Pat. Nos. 6,320,031, 6,068, 687, US patent application publication No 2004-068102 (especially example 1 at [0157]), PCT application publication Nos WO2005-160937 (especially examples Yellow R1 and R2 at [0028] and [0029]), WO2005-007752 (especially example 1 at [0024]) and WO2002-075573 and salts thereof; magenta pigments, for example C.I. Pigment Red 122, 202, 209 and C.I. Pigment Violet 19; magenta dyes, for example PRO-JET™ Fast Magenta 2, PRO-JET™ Magenta BTX, 3BOA, 2BTX and 1T; C.I. Acid Red 52 and 249; C.I. Reactive Red 180, 31 and 23; and C.I. Direct Red 227; cyan pigments, for example C.I. Pigment Blue 15, 15:1, 15:2, 15:3, 15:4, 15:6, 16 and 60; cyan dyes, for example phthalocyanine colorants, especially C.I. Direct Blue 86, 199 and C.I. Acid Blue 9, 99; black pigments, for example C.I. Pigment Black 7 and the self-dispersing black pigments sold under the Cab-O-Jet® trade name by Cabot Corp (e.g. Cab-O-Jet 300); and black dyes, for example C.I. Food Black 2, C.I. Direct Black 19, 154, 168, 195, C.I. Reactive Black 31, PRO-JET™ Fast Black 2 and black dyes described in patents by Lexmark (for example EP 0 539,178 A2, examples 1, 2, 3, 4 and 5), Orient Chemicals (for example EP 0 347 803 A2, pages 5 to 6, azo dyes 3, 4, 5, 6, 7, 8, 12, 13, 14, 15 and 16) and Seiko Epson Corporation.

Preferably, the further colorant comprises a dye.

It is preferred that the further colorant comprises a water-soluble dye or salt thereof.

The colorant mixture preferably comprises:
(a) from 1 to 99, more preferably from 3 to 70 and especially from 5 to 50 parts in total of the compound(s) of Formula (1) or salt thereof; and
(b) from 99 to 1, more preferably from 30 to 97 parts and especially 95 to 50 parts in total of a water-soluble dye(s) other than a compound of Formula (1) or salt thereof;

wherein the parts are by weight and the sum of the parts (a)+(b)=100.

The composition may contain a single compound of Formula (1) or a mixture thereof. Similarly, the composition may contain in (b) a single water-soluble dye or a mixture of two or more water-soluble dyes other than a compound of Formula (1) or salt thereof.

The compounds of Formula (1) and colorant mixtures may be, and preferably are, purified to remove undesirable impurities before they are incorporated into inks for ink jet printing. Conventional techniques may be employed for purification, for example ultrafiltration, reverse osmosis and/or dialysis.

According to a third aspect of the present invention there is provided an ink comprising:
(a) a compound of Formula (1) or a salt thereof according to the second aspect of the present invention; and
(b) a liquid medium.

Preferably, the ink is suitable for use as an ink jet printing ink.

The liquid medium preferably comprises:
(i) water;
(ii) a mixture of water and an organic solvent; or
(iii) an organic solvent free from water.

A preferred ink according to the fourth aspect of the present invention comprises:
(a) from 0.01 to 30 parts of a compound of Formula (1) or salt according to the second aspect of the present invention; and
(b) from 70 to 99.99 parts of a liquid medium;

wherein the liquid medium comprises an organic solvent, the parts are by weight and the number of parts of (a) and (b)=100.

The number of parts by weight of component (a) is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 95 parts. The number of parts (a)+(b) is 100 and all parts mentioned here are by weight.

Preferably, component (a) is completely dissolved in component (b). Preferably, component (a) has a solubility in component (b) at 20° C. of at least 10% by weight. This allows the preparation of liquid dye concentrates which may be used to prepare more dilute inks and reduces the chance of the compound(s) of component (a) of the ink precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 70:30.

It is preferred that the organic solvent is a water-miscible organic solvent or a mixture of such organic solvents. Preferred water-miscible organic solvents include: $C_{1-6}$alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy) ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably, the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A incorporated herein by reference.

When the liquid medium comprises an organic solvent free from water, (that is, less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent a polar solvent is preferably included because this enhances solubility of the dye in the liquid medium. Examples of polar solvents include $C_{1-4}$-alcohols and ketones. In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is an organic solvent free from water it is a mixture of 2 to 5 different organic solvents. This allows a liquid medium to be selected that gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

An especially preferred ink comprises:
(a) from 1 to 10 parts in total of a compound of Formula (1) or salt thereof according to the first or second aspect of the present invention;
(b) from 2 to 60, more preferably 5 to 40 parts of water-miscible organic solvent; and
(c) from 30 to 97, more preferably 40 to 85 parts water;

wherein all parts are by weight and the sum of the parts (a)+(b)+(c)=100.

Compounds of Formula (1) may be used in phase change inks e.g. wax-based inks. It may also be appropriate to use one or more low melting solid media with a compound of Formula (1). Preferred low melting solid media have a melting point in the range from 60° C. to 125° C. Suitable low melting point solids include long chain fatty acids or alcohols, preferably those with $C_{18-24}$ chains, and sulfonamides. The compound(s) of Formula (1) may be dissolved in the low melting point solid or may be finely dispersed in it.

The ink may also contain additional components conventionally used in ink jet printing inks, for example viscosity and surface tension modifiers, corrosion inhibitors, biocides, kogation reducing additives, anti-cockle agents (to reduce paper curling) and surfactants (which may be ionic or non-ionic).

The pH of the ink is preferably from 4 to 11 more preferably from 7 to 10.

The viscosity of the ink at 25° C. is preferably less than 50 mPa·s, more preferably less that 20 mPa·s and especially less than 5 mPa·s. Preferably, the viscosity is newtonian. Preferably, the viscosity is measured at a shear rate of 10 rpm using a cone and plate rheometer at a temperature of 25° C.

The ink is preferably filtered through a filter having an average pore size of less than 10 microns, more preferably the ink is filtered through a filter having an average pore size of from 10 to 0.5 microns. This reduces the amounts of oversized particles that might otherwise tend to block the ink jet printing nozzles.

The ink according to the third aspect of the present invention preferably has a concentration of halide ions of less than 500 parts per million, more preferably less than 100 parts per million. It is especially preferred that the ink has less than 100, more preferably less than 50 parts per million of divalent and trivalent metals, wherein parts refer to parts by weight relative to the total weight of the ink. Purifying the ink to reduce the concentration of these undesirable ions reduces nozzle blockage in ink jet printing heads, particularly in thermal ink jet printers.

The ink of the present invention preferably forms the yellow ink of a yellow, magenta, cyan and black ink set.

In the case of a typical dye-based ink set the magenta ink may contain for example C.I. Direct Red 227, C.I. Acid Red 52, 249 or Pro-Jet™ Fast Magenta 2, the cyan ink may contain for example C.I. Direct Blue 86, 199, C.I. Acid Blue 9 or Pro-Jet™ Fast Cyan 2 and the black ink may contain for example C.I. Direct Black 168, 199 or Pro-Jet™ Fast Black 2. (Pro-Jet is a trademark of Fujifilm Imaging Colorants Limited). The yellow ink may contain, for example, a compound of Formula (1) or salt thereof as defined in the second aspect of the present invention and optionally one or more further colorants selected from yellow dyes, especially the yellow dyes indicated above as being suitable further colorants.

In the case of a pigment-based ink set each ink preferably contains a further colorant selected from the pigments indicated above as being suitable further colorants. The magenta inks may contain, for example, C.I. Pigment 122, 202 and/or 209. The cyan ink may contain, for example, C.I. Pigment Blue 15:3, 15:4 and/or 16. The black may contain, for example, C.I. Pigment Black 7 and/or Cab-O-Jet® 300. The yellow ink may contain, for example, a compound of Formula (1) as defined in the second aspect of the present invention and one or more of the further yellow pigments indicated above as being suitable further colorants.

The ink jet printer preferably applies the ink to the substrate in the form of droplets which are ejected through a small orifice onto the substrate. Preferred ink jet printers are piezoelectric ink jet printers and thermal ink jet printers. The substrate is preferably paper, plastic, a textile, metal or glass, more preferably a treated substrate such as a coated paper, an overhead projector slide, a textile material or coated plastic, especially coated paper.

The coated paper may be coated with a porous or swellable ink receptor layer.

A fourth aspect of the present invention provides a substrate (preferably paper, an overhead projector slide or a textile material) printed with an ink comprising a liquid medium and a compound of Formula (1) or salt thereof as defined in the second aspect of the present invention.

According to a fifth aspect of the present invention there is provided an ink jet printer cartridge comprising a chamber and ink, wherein the ink is present in the chamber and the ink is as defined in the third aspect of the present invention.

According to a sixth aspect of the present invention there is provided an ink jet printer containing an ink jet printer cartridge, wherein the ink jet printer cartridge is as defined in the fifth aspect of the present invention.

According to a seventh aspect of the present invention there is provided the use of a compound of Formula (1) as defined in the first aspect of the present invention for preparing an ink jet printing ink comprising the compound of Formula (1) or salt thereof, water and an organic solvent. The preferred liquid media and compounds of Formula (1) and are as hereinbefore described.

The invention is further illustrated by the following examples in which all parts and percentages are by weight unless otherwise stated.

EXAMPLE 1

Preparation of Dye (1)

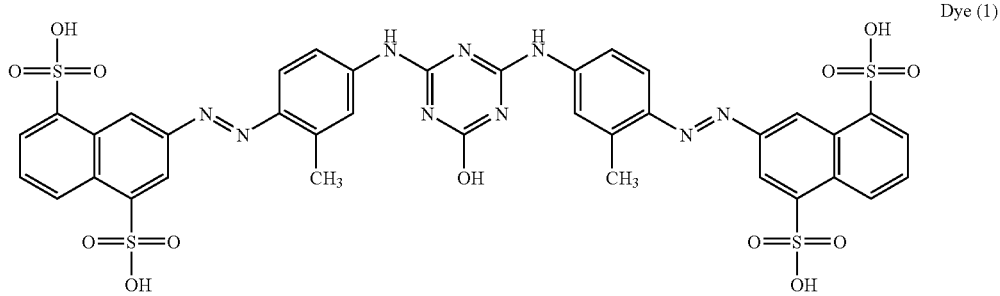

Dye (1)

Dye (1) was prepared according to the stages (a) to (c):

Stage (a):

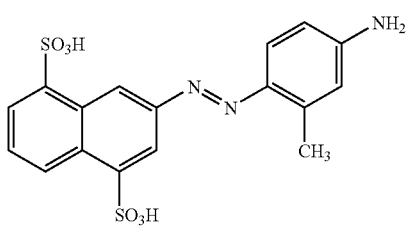

3-aminonaphthalene-1,5-disulfonic acid (60.6 g, 0.2 mol) was dissolved in water (600 ml) which was then adjusted to pH 7 by the addition of 2N sodium hydroxide solution followed by the addition of sodium nitrite (13.8 g, 0.2 mol). The solution was then added dropwise to a mixture of concentrated hydrochloric acid (100 ml) and water (100 ml) at 0-5° C. to from a reaction mixture. The reaction mixture was stirred for 2 hours at 0-5° C. m-Toluidine (21.4 g, 0.2 mol) was added dropwise to the reaction mixture at 0-5° C., the pH was adjusted to pH 4-5 by the addition of sodium acetate and the reaction mixture was stirred for 4 hours at 0-5° C. The product was collected by filtration and dried to give 67 g (80%) of a red solid.

Stage (b):

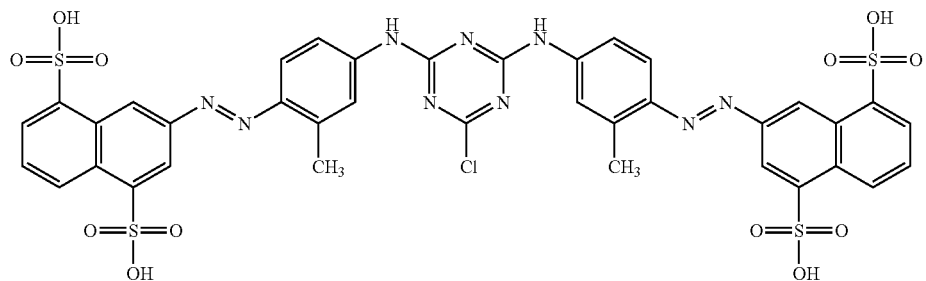

A solution of cyanuric chloride (9.2 g, 0.05 mol) in acetone (100 ml) was added to a mixture of ice/water (300 g). A first portion of the product from stage (a) (21.1 g, 0.05 mol) was dissolved in water (200 ml) which was then adjusted to a pH of 7 with 2N aqueous sodium carbonate forming a solution. This solution was then added to the cyanuric chloride suspension at 0-5° C. to form a reaction mixture. The pH of the reaction mixture was maintained at pH 5-6.5 (using 2N sodium carbonate solution) for 1 hour, the temperature was then allowed to warm to 20° C. A second portion of the product from stage (a) (21.1 g, 0.05 mol) was dissolved in water (200 ml) and adjusted to pH 7 as described above and then added to the reaction mixture at 20° C. The reaction mixture was stirred at 30-40° C., pH 7-8 (using 2N sodium hydroxide solution) for 18 hours. The product was collected by filtration and the product was used in stage (c) without drying or purification.

Stage (c): Preparation of Dye (1):

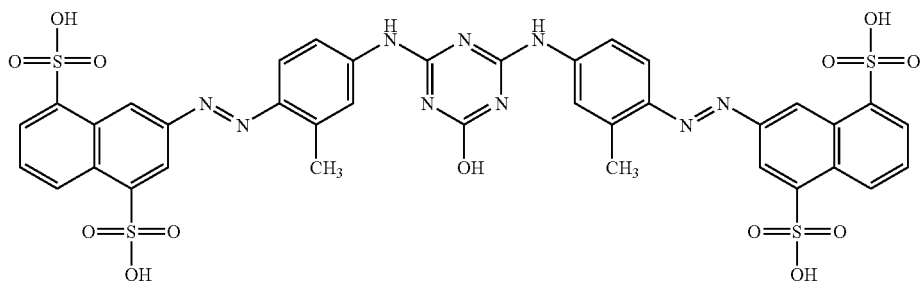

A solution of the product from stage (b) in water (1000 ml) and 48% sodium hydroxide solution (100 ml) was stirred at 60-70° C. for 4 hours and then allowed to cool to room temperature. The product was collected by filtration, the solid was then suspended in water (500 ml) and purified by dialysis in membrane tubing to a low conductivity (less than 50 μs). Dye (1) was obtained by evaporation at 60° C. to afford an orange solid (38 g). Yield 41%, λ max=377. Analysis by mass spectrometry found m/z 934 (M−H)⁻/936 (M+H)⁺. Requires MW=935.

EXAMPLE 2

Dye (2)

3-aminonaphthalene-1,5-disulfonic acid (60.6 g, 0.2 mol) was dissolved in water (600 ml) which was then adjusted to pH 7 by the addition of 2N sodium hydroxide solution followed by the addition of sodium nitrite (13.8 g, 0.2 mol). The solution was then added dropwise to a mixture of concentrated hydrochloric acid (100 ml) and water (100 ml) at 0 to 5° C. to form a reaction mixture. The reaction mixture was stirred for 2 hours at 0 to 5° C. A solution of N-(3-aminophenyl)urea (30.2 g, 0.2 mol) in water (200 ml) was added dropwise to the reaction mixture at 0 to 5° C., the pH was adjusted to pH 4 to 5 by the addition of sodium acetate and the reaction mixture was stirred for 4 hours at 0 to 5° C. The product was collected by filtration and dried to give 53.0 g (57%) of a red solid.

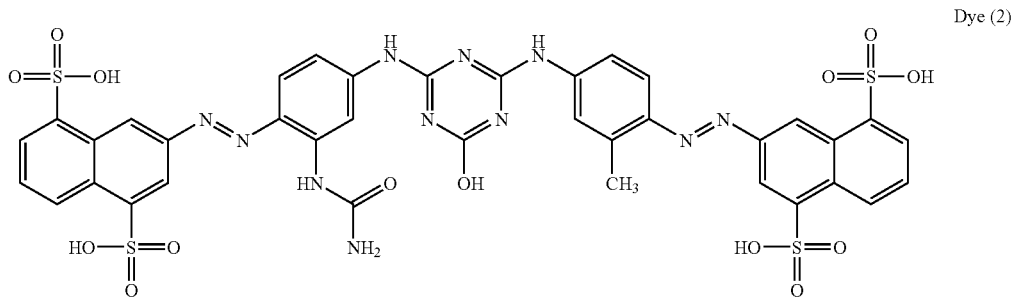

Dye (2)

Dye (2) was prepared according to the stages (a) to (d):

Stage (a):

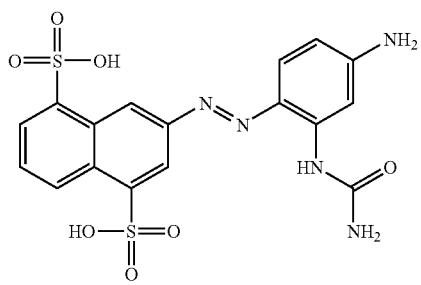

Stage (b):

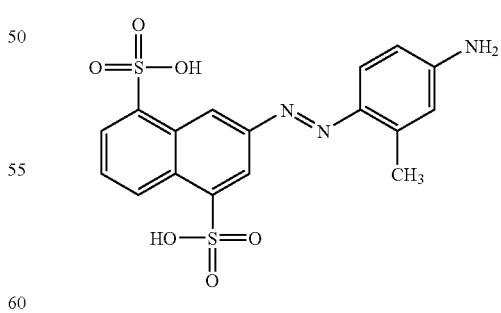

3-aminonaphthalene-1,5-disulfonic acid (60.6 g, 0.2 mol) was dissolved in water (600 ml) which was then adjusted to pH 7 by the addition of 2N sodium hydroxide solution followed by the addition of sodium nitrite (13.8 g, 0.2 mol), this formed a solution. The solution was then added dropwise to a mixture of concentrated hydrochloric acid (100 ml) and water (100 ml) at 0 to 5° C. to form a reaction mixture. The reaction mixture was stirred for 2 hours at 0 to 5° C. m-Toluidine (21.4 g, 0.2 mol) was then added dropwise to the reaction mixture at 0 to 5° C., the pH was adjusted to pH 4 to 5 by the addition of sodium acetate and the reaction mixture was stirred for 4 hours at 0 to 5° C. The product was collected by filtration and dried to give 67 g (80%) of a red solid.

Stage (c):

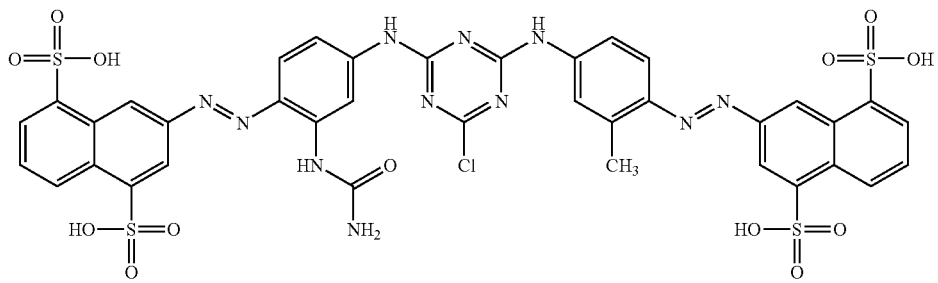

A solution of cyanuric chloride (9.2 g, 0.05 mol) in acetone (100 ml) was added to a mixture of ice/water (300 g). The product from stage (a) (23.3 g, 0.05 mol) was dissolved in water (200 ml) which was then adjusted to pH 7 by the addition of 2N sodium carbonate solution and then added to the cyanuric chloride suspension at 0 to 5° C. to form a reaction mixture. The pH of the reaction mixture was maintained at pH 5 to 6.5 (2N sodium carbonate solution) for 1 hour, the temperature was then allowed to warm to 20° C. The product from stage (b) (21.1 g, 0.05 mol) was dissolved in water (200 ml) as described above and then added to the reaction mixture at 20° C. The reaction mixture was stirred at 30-40° C., pH 7-8 (2N sodium hydroxide solution) for 18 hours. The product was collected by filtration and the product was used in stage (d) without drying or purification.

Stage (d): Preparation of Dye (2):

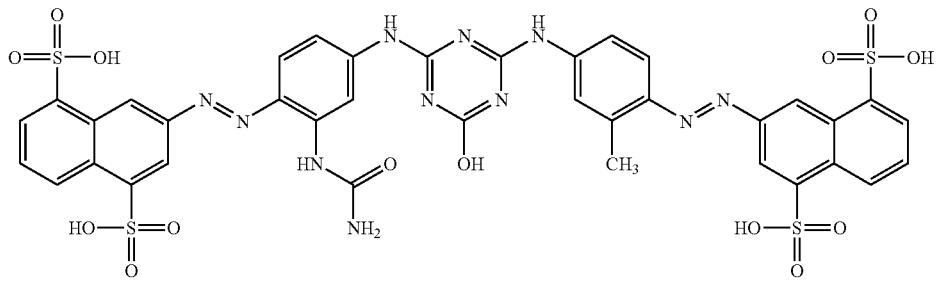

A solution of the product from stage (c) in water (1000 ml) was adjusted to pH 9.5 by the addition of 2M LiOH solution to form a reaction mixture. The reaction mixture was stirred at 70 to 80° C. for 4 hours and then allowed to cool to room temperature. The product was precipitated by the addition of lithium chloride (200 g) and the solid collected by filtration. The product was dissolved in water (500 ml) and purified by dialysis in membrane tubing to a low conductivity (less than 50 μs). Dye (2) was obtained by evaporation at 60° C. to afford an orange solid (34 g). Yield 70%, λ max=377. Analysis by mass spectrometry found m/z 489 (M−2H)⁻. Requires MW=980.

EXAMPLES 3 TO 23

Dyes 3 to 23 were prepared according to the method described above for example 1 wherein 3-aminonaphthalene-1,5-disulfonic acid was replaced with the compound shown in column A of Table A and m-toluidine was replaced with the compound shown in column B of Table A in the same molar amounts. The final dye structures are shown in the last column of Table A.

TABLE A

| Example | A | B |
|---|---|---|
| 3 | naphthalene with three SO$_3$H groups and NH$_2$ | 3-methylaniline (m-toluidine) |
| 4 | naphthalene-1-sulfonic acid, 2-amino, 5-sulfonic acid | aniline |
| 5 | naphthalene with SO$_3$H at 1,5 and NH$_2$ at 7 | 2-ethoxyaniline |
| 6 | naphthalene with SO$_3$H at 1,5 and NH$_2$ at 7 | aniline |
| 7 | 2-amino-5-sulfonic acid naphthalene | 3-methylaniline |

TABLE A-continued
| | | |
|---|---|---|
| 8 | 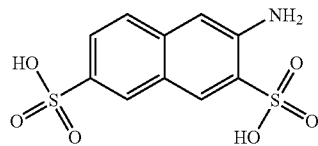 | 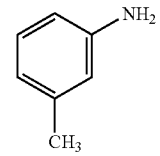 |
| 9 | 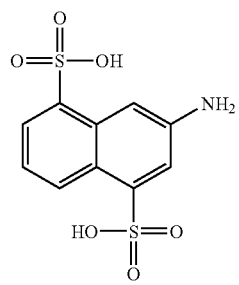 | 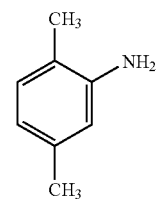 |
| 10 | 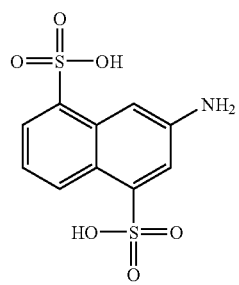 | 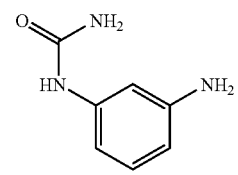 |
| 11 | 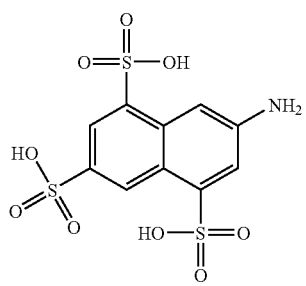 | 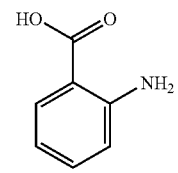 |
| 12 | 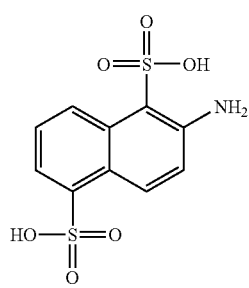 | 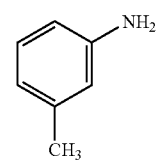 |
| 13 | 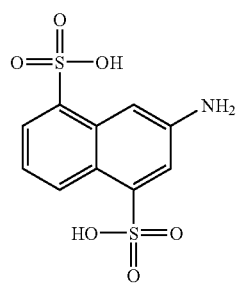 | 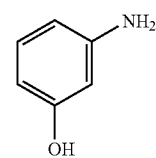 |

TABLE A-continued
| | | |
|---|---|---|
| 14 | 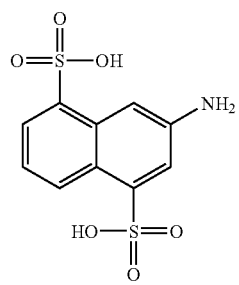 | 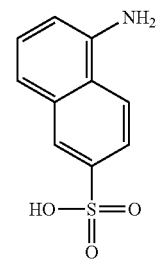 |
| 15 | 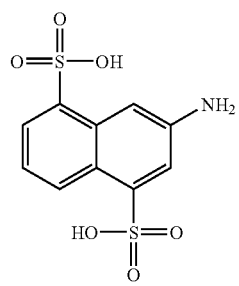 | 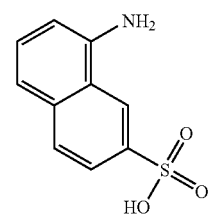 |
| 16 | 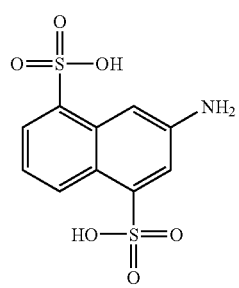 | 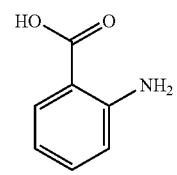 |
| 17 | 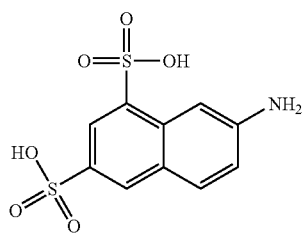 | 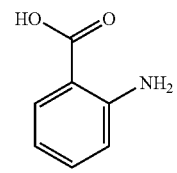 |
| 18 | 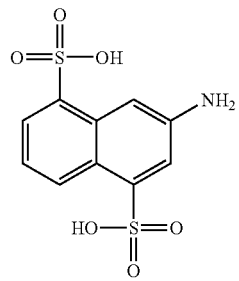 | 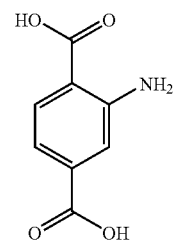 |

TABLE A-continued
| 19 | 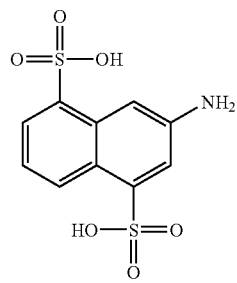 | 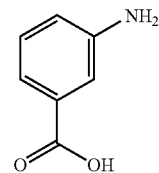 |
| --- | --- | --- |
| 20 | 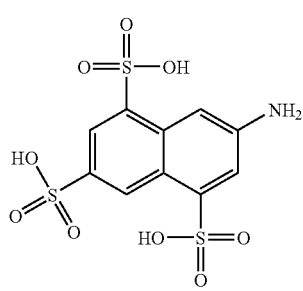 | 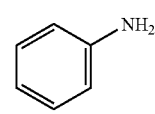 |
| 21 | 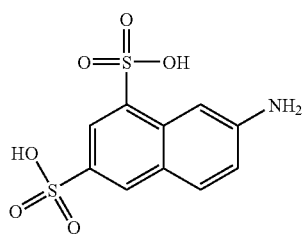 | 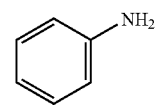 |
| 22 | 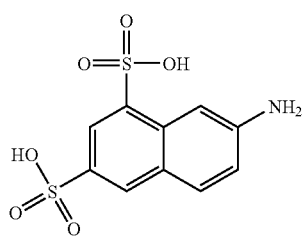 | 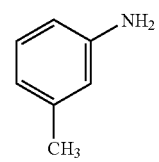 |
| 23 | 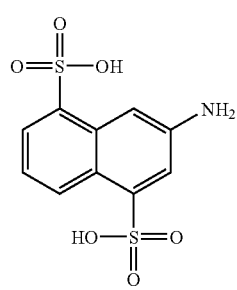 | 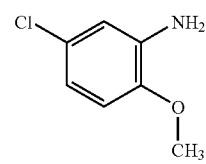 |

TABLE A-continued

| Example | Dye Structure |
|---|---|
| 3 | (structure) |
| 4 | (structure) |
| 5 | (structure) |
| 6 | (structure) |
| 7 | (structure) |

TABLE A-continued
8 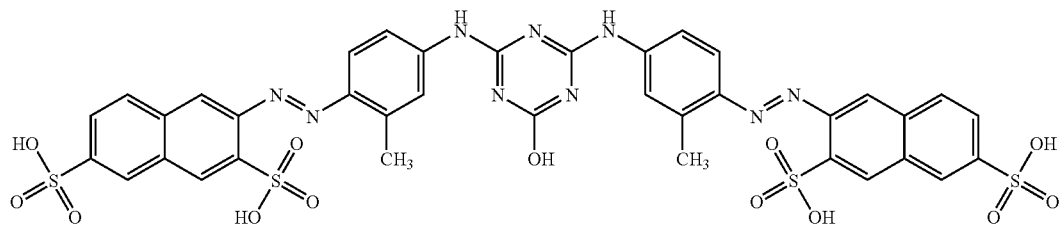
9 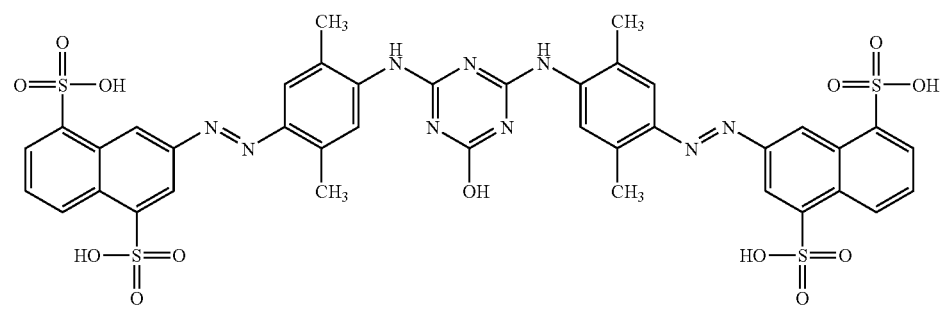
10 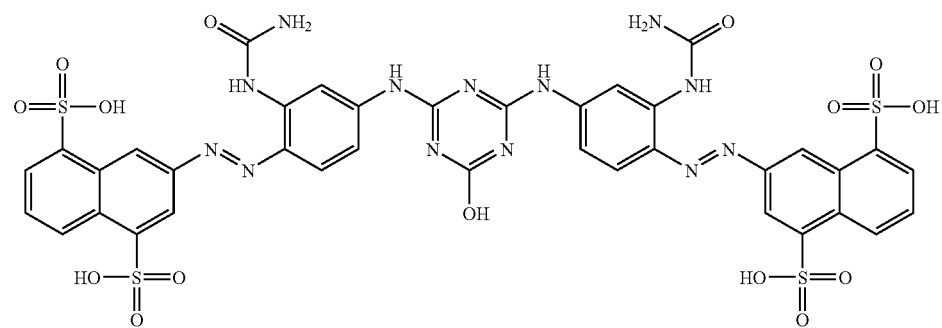
11 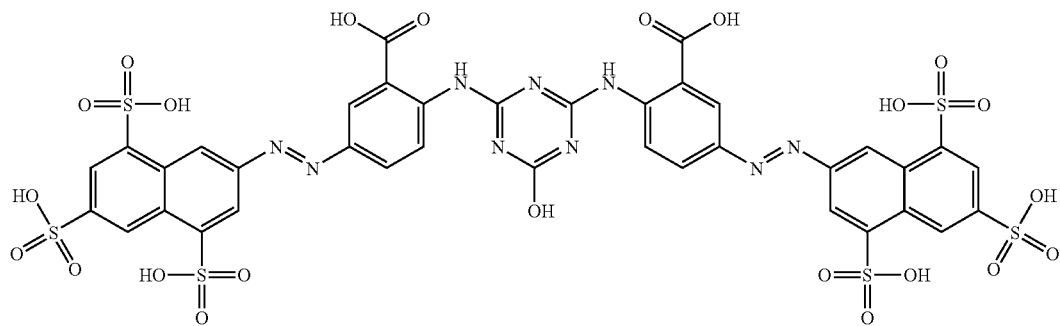
12 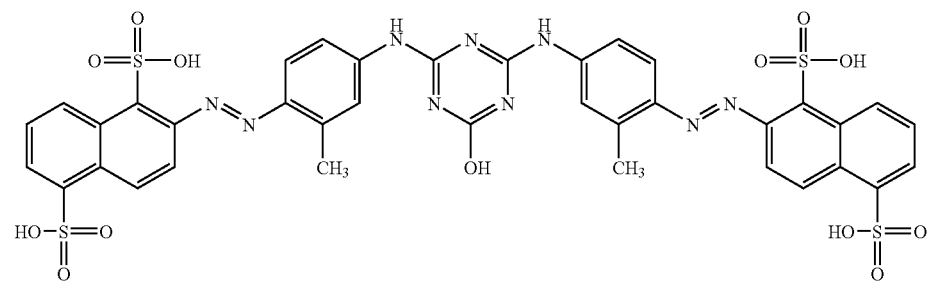

TABLE A-continued
13
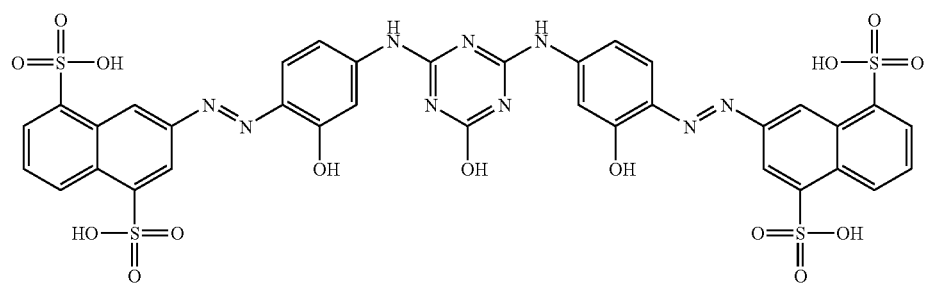
14
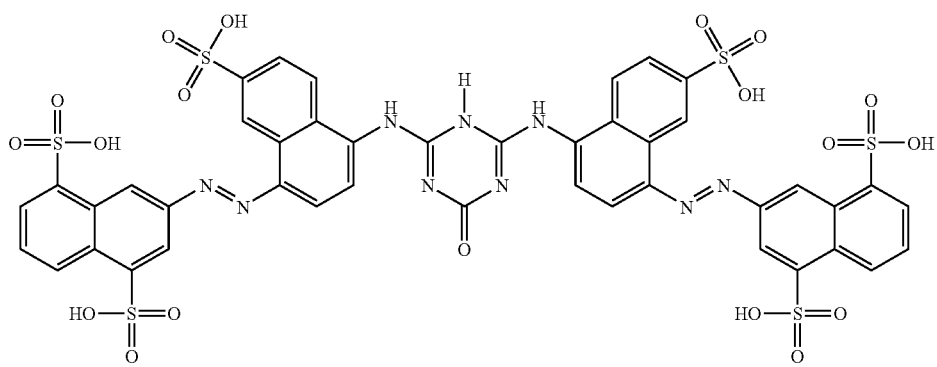
15
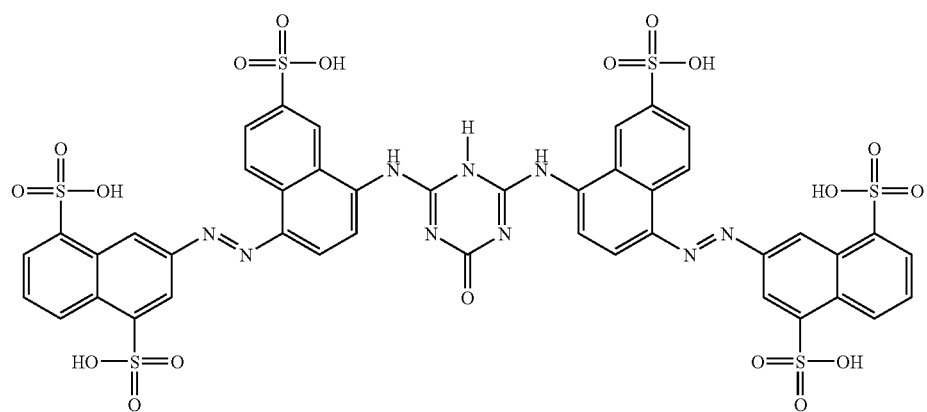
16
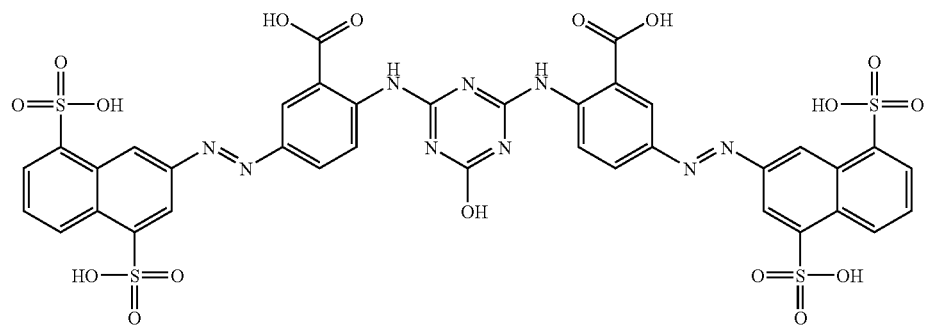

TABLE A-continued
17 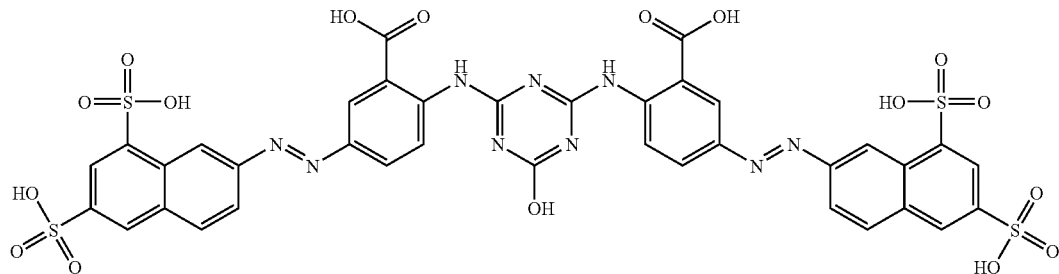
18 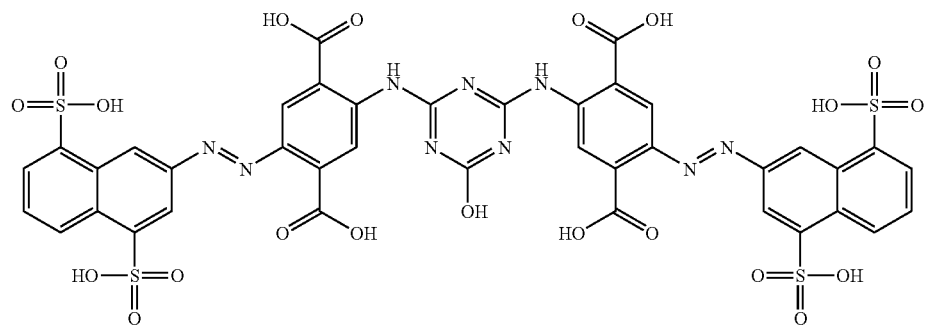
19 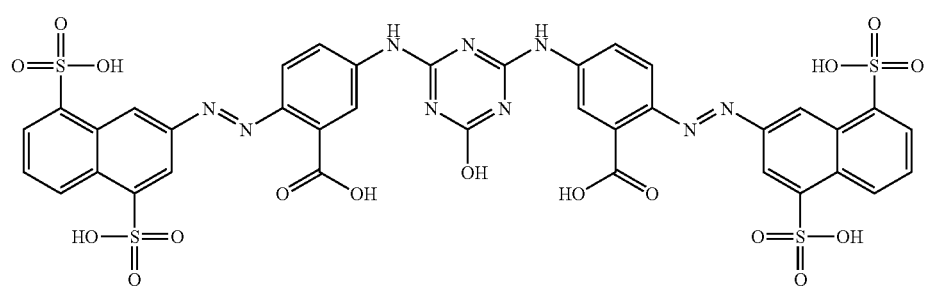
20 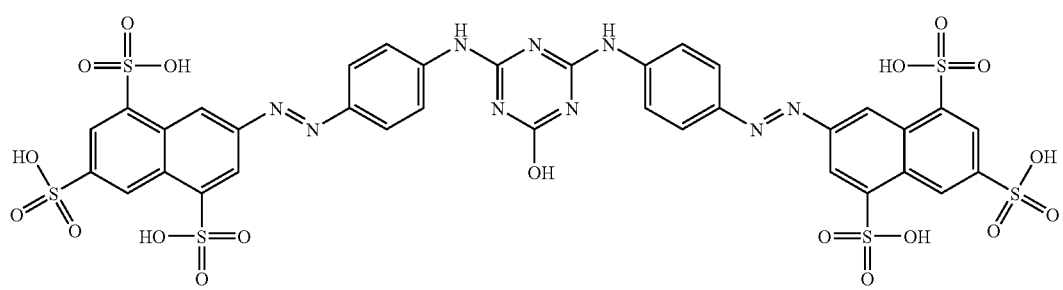
21 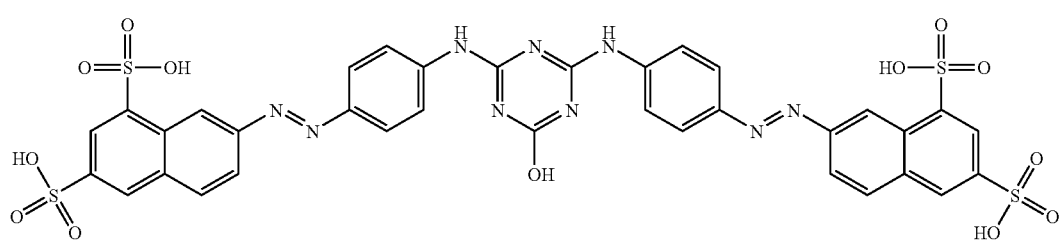

TABLE A-continued

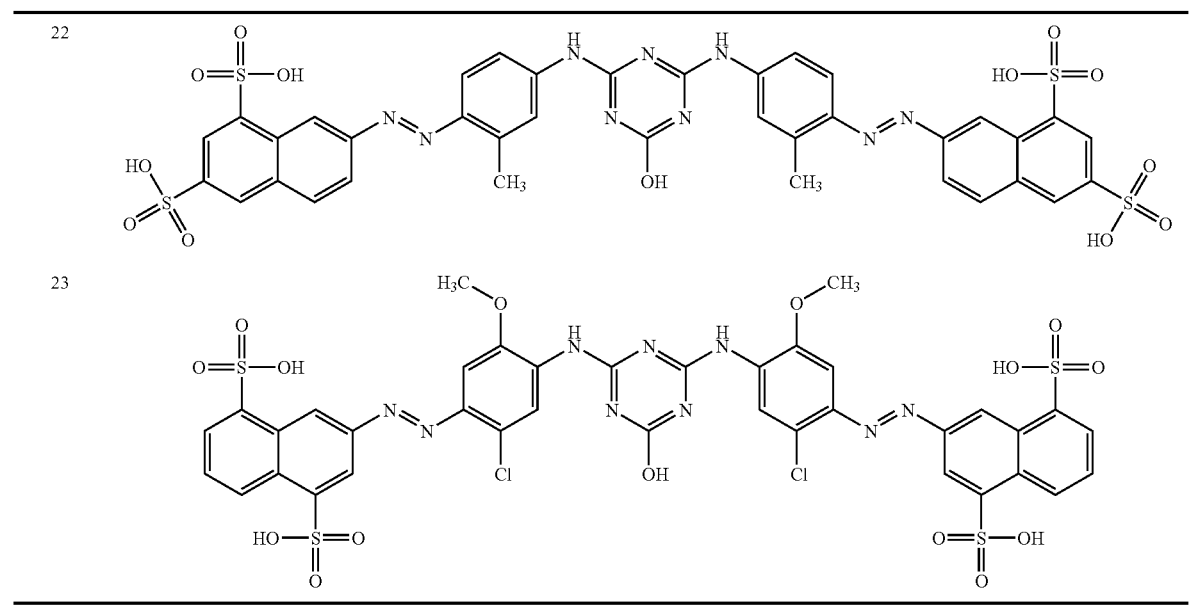

Inks

Ink (1) and Comparative Ink (1) were prepared by mixing the components as indicated in Table B.

TABLE B

| Component | Ink (1) | Comparative Ink (1) |
|---|---|---|
| 2-Pyrollidone | 5 | 5 |
| Thiodiethylene glycol | 5 | 5 |
| Surfynol ™ 465 | 1 | 1 |
| Deionized water | 86 | 86 |
| Dye (1) as prepared in Example 1 | 3 | |
| C.I. Direct Yellow 86 | | 3 |

C.I. Direct Yellow 86 is a commercially available dye having a structure very similar to the compounds as defined in the first aspect of the present invention of the present invention.

C.I. Direct Yellow 86

Preparation of Prints

Ink (1) and Comparative Ink (1) were each printed onto Xerox 4024™, HP Premium Plus™, Epson Premium Photo™ and HP Advanced Photo™ paper substrates using a Canon i965 ink jet printer.

Testing of Prints

The initial Reflectance optical density (ROD) of the prints was measured using an Xrite 983™ Spectrodensitometer.

The prints were then exposed to either light fastness or ozone fastness tests.

Light Fastness

To measure the light fastness prints were irradiated in an Atlas Ci35 Weatherometer™ for 400 hours.

Ozone Fastness

To measure the ozone fastness prints were exposed to ozone using an ozone test cabinet from Hampden Test Equipment. The test was carried out for 192 hours at 40° C. and 55% relative humidity in the presence of 1 parts per million of ozone.

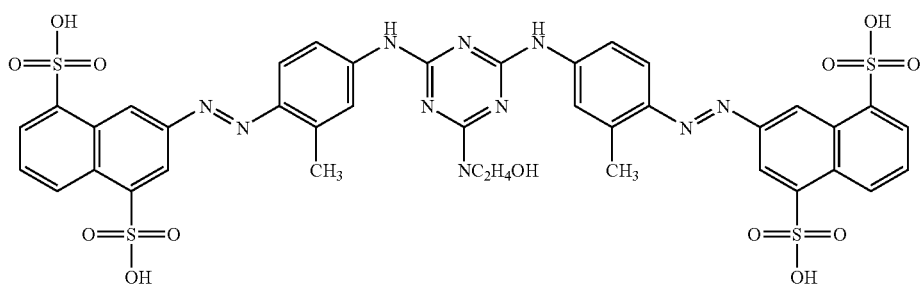

C.I. Direct Yellow 86

The final ROD of the prints was measured and the % ROD reduction was calculated using the formula:

%ROD reduction = ROD(final)/ROD(initial)×100

Results

The results of the light fastness and ozone fastness tests are tabulated in Table C.

TABLE C

| Paper substrate | Ink | Light fastness % ROD reduction | Ozone fastness % ROD reduction |
|---|---|---|---|
| Xerox 4024 ™ | Ink (1) | 49 | |
| | Comparative Ink (1) | 61 | |
| HP Premium plus ™ | Ink (1) | 23 | |
| | Comparative Ink (1) | 48 | |
| Epson Premium photo ™ | Ink (1) | 55 | 22 |
| | Comparative Ink (1) | 84 | 37 |
| HP Advanced photo ™ | Ink (1) | 45 | 33 |
| | Comparative Ink (1) | 78 | 38 |

Lower values of % ROD represent better light or ozone fastness and less fading of the printed colour.

Table C clearly shows that the compounds as defined in the first aspect of the present invention provide ink jet printing inks having much improved light fastness and ozone resistance when compared to the same ink jet printing ink containing C.I. Direct Yellow 86 as the colorant.

Further Inks

The inks described in Tables I and II may be prepared wherein the Dye described in the first column is the Dye made in the above example of the same number. Numbers quoted in the second column onwards refer to the number of parts of the relevant ingredient and all parts are by weight. The inks may be applied to paper by thermal or piezo ink jet printing.

The following abbreviations are used in Table I and II:

| | |
|---|---|
| PG = | propylene glycol |
| DEG = | diethylene glycol |
| NMP = | N-methyl pyrrolidone |
| DMK = | dimethylketone |
| IPA = | isopropanol |
| MEOH = | methanol |
| 2P = | 2-pyrrolidone |
| MIBK = | methylisobutyl ketone |
| P12 = | propane-1,2-diol |
| BDL = | butane-2,3-diol |
| CET = | cetyl ammonium bromide |
| PHO = | $Na_2HPO_4$ |
| TBT = | tertiary butanol |
| TDG = | thiodiglycol |

TABLE I

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | | | | | 6 | | 5 |
| 10 | 4.1 | 80 | 3 | 5 | 2 | 10 | | 0.3 | | | | |
| 2 | 3.2 | 65 | | 5 | 4 | 6 | | | 5 | 4 | 6 | 5 |
| 1 | 5.1 | 96 | | | | | | | | 4 | | |
| 1 | 10.8 | 90 | 5 | | | | | | 5 | | | |
| 2 | 10.0 | 80 | 2 | 6 | 2 | 5 | | | 1 | | 4 | |
| 1 | 1.8 | 80 | | 5 | | | | | | | 15 | |
| 2 | 2.6 | 84 | | | 11 | | | | | | 5 | |
| 3 | 3.3 | 80 | 2 | | | 10 | | | | 2 | | 6 |
| 4 | 12.0 | 90 | | | 7 | | 0.3 | | 3 | | | |
| 5 | 5.4 | 69 | 2 | 20 | 2 | 1 | | | | | 3 | 3 |
| 6 | 6.0 | 91 | | | 4 | | | | | | 5 | |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 7 | 3.0 | 80 | 15 | | | 0.2 | | | | | 5 | |
| 8 | 9.0 | 90 | | 5 | | | | | | 1.2 | | 5 |
| 9 | 1.5 | 85 | 5 | 5 | | 0.15 | 5.0 | 0.2 | | | | |
| 10 | 2.5 | 90 | | 6 | 4 | | | | | 0.12 | | |
| 10 | 3.1 | 82 | 4 | 8 | | 0.3 | | | | | | 6 |
| 9 | 0.9 | 85 | | 10 | | | | | 5 | 0.2 | | |
| 7 | 8.0 | 90 | | 5 | 5 | | | 0.3 | | | | |
| 8 | 4.0 | 70 | | 10 | 4 | | | | 1 | | 4 | 11 |
| 5 | 2.2 | 75 | 4 | 10 | 3 | | | | 2 | | 6 | |

TABLE II-continued

| Dye | Dye Content | Water | PG | DEG | NMP | CET | TBT | TDG | BDL | PHO | 2P | PI2 |
|---|---|---|---|---|---|---|---|---|---|---|---|---|
| 6 | 10.0 | 91 | | | 6 | | | | | | 3 | |
| 3 | 9.0 | 76 | | 9 | 7 | | 3.0 | | | 0.95 | 5 | |
| 4 | 5.0 | 78 | 5 | 11 | | | | | | | 6 | |
| 2 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | 10 | | | | | | | | |
| 2 | 2 | 88 | | | | | | 10 | | | | |
| 1 | 5 | 78 | | | 5 | | | 12 | | | 5 | |
| 3 | 8 | 70 | 2 | | 8 | | | 15 | | | 5 | |
| 1 | 10 | 80 | | | | | | 8 | | | 12 | |
| 4 | 10 | 80 | | 10 | | | | | | | | |

EXAMPLE 24

Inks may be prepared having the formulations described in US Patent Application Publication No. 2005/0076806 except that a compound of Formula (1) as defined in the first aspect of the present invention or salt thereof is used in place of the colorant described therein. Preferred inks of this type are described in Table 1 at pages 9 and 10 of US 2005/0076806. Especially preferred inks of this type are described below in Table III and they may be prepared by mixing the components indicated therein. The inks may be applied to paper by thermal or piezo ink jet printing.

TABLE III

| | Number of parts (by weight) | | | |
|---|---|---|---|---|
| Component | Ink A | Ink B | Ink C | Ink D |
| Dye 1 (from Example 1 above) | 5 | 5 | 5 | 5 |
| Tripropanolamine | 0.3 | 0.3 | 0.5 | 0.3 |
| Adipic acid | 0.1 | | | 0.082 |
| Succinic acid | | 0.03 | 0.11 | |
| Glycerol | 10 | 10 | 10 | 10 |
| Triethylene glycol mono n-butyl ether | 10 | 10 | 10 | 10 |
| 2P | 2 | 2 | 2 | 2 |
| Triethylene glycol | 3 | 3 | 2.8 | 2 |
| Surfynol 465$^{RTM}$ | 1 | 1 | 1 | 1 |
| Water | 68.6 | 68.67 | 68.59 | 69.61 |

Surfynol 465® is an acetylenic glycol-based surfactant available from Air Products.

2P is 2-pyrrolidone.

EXAMPLE 25

Inks may be prepared having the formulations described above in Table III except that diethylene glycol mono n-butyl ether is used in place of triethylene glycol mono n-butyl ether. Still further inks may be prepared having the formulations described above in Table III except that N-methylpyrrolidone may be used in place of 2-pyrrolidone.

EXAMPLE 26

Inks may be prepared as described in Japanese Patent Application No. 2005-047987 except that a compound of Formula (1) as defined in the first aspect of the present invention or salt thereof is used in place of the colorant used therein.

Preferred inks of this type are described in claim 3 and Table 1 at [0054]) of JP2005-047987. In particular it is preferred that the ink contains 1,2-hexane diol.

EXAMPLE 27

The black compositions A to D described in Table IV below may be prepared by mixing together the components in the amounts indicated. These black compositions may be used to prepare black ink jet printing inks, for example having an analogous formulation to the inks described in Table III above except that each of the black compositions described in Table IV is used instead of Dye 1 alone.

TABLE IV

| | Number of parts (by weight) | | | |
|---|---|---|---|---|
| Component | Composition A | Composition B | Composition C | Composition D |
| Dye 1 (from Example 1 above) | 0.8 | 1 | 2 | 0.8 |
| Black Dye described in WO 2003/106572, Example 2 at p13 to 15 | 5 | | | |
| C.I. Direct Black 154 | | 4.5 | | |
| C.I. Direct Black 168 | | | 1.5 | |
| C.I. Direct Black 195 | | | | 4.25 |

EXAMPLE 28

The yellow compositions E to I described in Table V below may be prepared by mixing together the components indicated. These yellow compositions may be used to prepare ink jet printing inks, for example having an analogous formulation to the inks described in Table III above except that each of the yellow compositions described in Table V is used instead of Dye 1 alone.

TABLE V

| Component | Composition E | Composition F | Composition G | Composition H | Composition I |
|---|---|---|---|---|---|
| Dye 1 (from Example 1 above) | 1.5 | 2 | 2 | 1.9 | 2.1 |
| C.I. Direct Yellow 86 | 3 | | 1.4 | | |
| C.I. Direct Yellow 88 | | 2.5 | | | |
| C.I. Direct Yellow 132 | | | 1.5 | | |
| C.I. Direct Yellow 173 | | | | 2 | |
| C.I. Acid Yellow 17 | | | | | 0.3 |

EXAMPLE 29

In each of the compositions A to I described above Dye 1 from Example 1 may be replaced by Dye 2 from Example 2 above or by any one of the dyes described in Examples 3 to 23.

EXAMPLES 30 TO 33

Ink sets may be prepared wherein each ink has the formulation described for Ink A in Table III above, except that in the magenta, cyan and black inks Dye 1 was replaced by the colorant indicated in Table VI below:

TABLE VI

| | Yellow Ink | Magenta Ink | Cyan Ink | Black Ink |
|---|---|---|---|---|
| Example 17 | Ink A | C.I. Acid Red 52 | C.I. Acid Blue 9 | Pro-Jet ™ Fast Black 2 |
| Example 18 | Ink A | C.I. Direct Red 227 | C.I. Direct Blue 199 | C.I. Direct Black 168 |
| Example 19 | Ink A | C.I. Acid Red 249 | C.I. Direct Blue 86 | C.I. Direct Black 168 |
| Example 20 | Ink A | Pro-Jet ™ Fast Magenta 2 | C.I. Direct Blue 199 | Cab-O-jet$^{RTM}$ 300 |

Cab-O-Jet™ is a trade mark of Cabot corporation.

The ink sets described in Table VI may be incorporated into a thermal ink jet printer and printed onto paper.

The invention claimed is:

1. A process for printing an image on a substrate comprising applying to the substrate by means of an ink jet printer an ink comprising a compound of Formula (1) or salt thereof:

Formula (1)

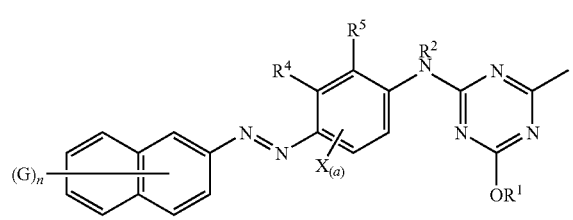

-continued

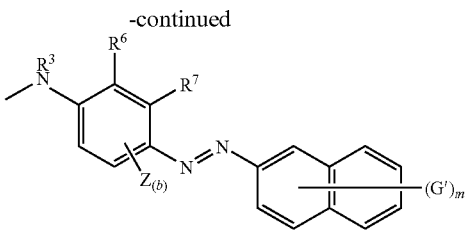

wherein:
 $R^4$, $R^5$, $R^6$ and $R^7$ are each independently H or an optionally substituted substituent or $R^4$ and $R^5$ and/or $R^6$ and $R^7$ together with the carbon atoms to which they are attached form an optionally substituted aryl or heterocyclic ring;
 X and Z are each independently H or an optionally substituted substituent;
 $R^1$ is H or optionally substituted $C_{1-4}$-alkyl;
 $R^2$ and $R^3$ are each independently H, $C_{1-4}$-alkyl, —CONR$^8$R$^9$, SO$_2$NR$^8$R$^9$ or aryl groups; wherein $R^8$ and $R^9$ are each independently H, optionally substituted $C_{1-8}$-alkyl, an optionally substituted aryl or heterocyclic ring, or $R^8$ and $R^9$ together with the nitrogen atom to which they are attached form an optionally substituted 5- or 6-membered ring;
 G and G' are each independently a sulfonic acid group, carboxylic acid group or phosphonic acid group;
 n and m are each independently is 0, 1, 2, 3, 4 or 5; and
 a and b are each independently 0, 1 or 2.

2. A process according to claim 1 wherein X and Z are each independently H, optionally substituted alkyl, optionally substituted alkoxy, optionally substituted aryl, optionally substituted heterocyclic, NR$^8$R$^9$, NHCOR$^8$, NHCONR$^8$R$^9$, —O(O)R$^8$, —O(O)OR$^8$, —O(O)NR$^8$R$^9$, PO$_3$H$_2$, —SR$^8$, —SO$_2$R$^8$, —SO$_2$NR$^8$R$^9$, —SOR$^8$, —SO$_3$H, CF$_3$, CN, NO$_2$, hydroxy or halogen.

3. A process according to claim 1 wherein $R^4$, $R^5$, $R^6$ and are each independently H, optionally substituted alkyl, optionally substituted alkoxy, optionally substituted aryl, optionally substituted heterocyclic, —NR$^8$R$^9$, —NHCOR$^8$, —NHCONR$^8$R$^9$, —C(O)R$^8$, —O(O)OR$^8$, —O(O)NR$^8$R$^9$, —PO$_3$H$_2$, —SR$^8$, —SO$_2$R$^8$, —SO$_2$NR$^8$R$^9$, —SOR$^8$, —SO$_3$H, —CF$_3$, —CN, —NO$_2$, hydroxy or halogen or $R^4$ and $R^5$ and/or $R^6$ and $R^7$ together with the carbon atoms to which they are attached form an optionally substituted 5 or 6 membered aryl or heterocyclic ring.

4. A process according to claim 1 wherein the compound of Formula (1) has from 2 to 6 sulfonic acid groups.

5. A process according to claim 1 wherein G and G' are each a sulfonic acid group.

6. A process according to claim 1 wherein n and m are each independently 1, 2 or 3.

7. A process according to claim 1 wherein one or more groups represented by $R^4$, $R^5$, $R^6$ and $R^7$ is H.

8. A process according to claim 1 wherein one or both of $R^4$ and $R^5$, and/or $R^6$ and $R^7$ is H.

9. A process according to claim 1 wherein:
$R^4$, $R^5$, $R^6$ and $R^7$ are each independently H, $C_{1-4}$-alkyl, $C_{1-4}$-alkoxy, carboxylic acid or $NHCONH_2$;
$R^1$ is H or $C_{1-4}$-alkyl;
$R^2$ and $R^3$ are each independently H or $C_{1-4}$-alkyl;
G and G' are each independently a sulfonic acid group, carboxylic acid group or phosphonic acid group;
n and m are each independently 1, 2 or 3; and
a and b are zero.

10. A process according to claim 1 wherein $R^1$ is H.

11. An ink comprising a liquid medium and a compound of Formula (1) or salt thereof:

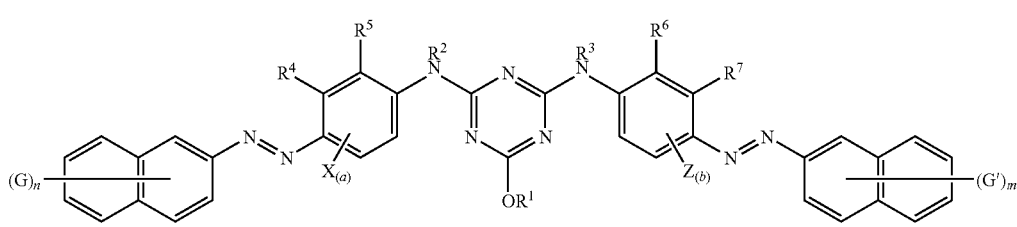

Formula (1)

wherein:
$R^4$, $R^5$, $R^6$ and $R^7$ are each independently H or an optionally substituted substituent or $R^4$ and $R^5$ and/or $R^6$ and $R^7$ together with the carbon atoms to which they are attached form an optionally substituted aryl or heterocyclic ring;

X and Z are each independently H or an optionally substituted substituent;

$R^1$ is H or optionally substituted $C_{1-4}$-alkyl;

$R^2$ and $R^3$ are each independently H, $C_{1-4}$-alkyl, $-CONR^8R^9$, $-SO_2NR^8R^9$ or aryl groups; wherein $R^8$ and $R^9$ are each independently H, optionally substituted $C_{1-8}$-alkyl, an optionally substituted aryl or heterocyclic ring, or $R^8$ and $R^9$ together with the nitrogen atom to which they are attached form an optionally substituted 5- or 6-membered ring;

G and G' are each independently a sulfonic acid group, carboxylic acid group or phosphonic acid group;

n and m are each independently is 0, 1, 2, 3, 4 or 5; and
a and b are each independently 0, 1 or 2;

with the proviso that the compound of Formula (1) is not of the Formula A, B or C

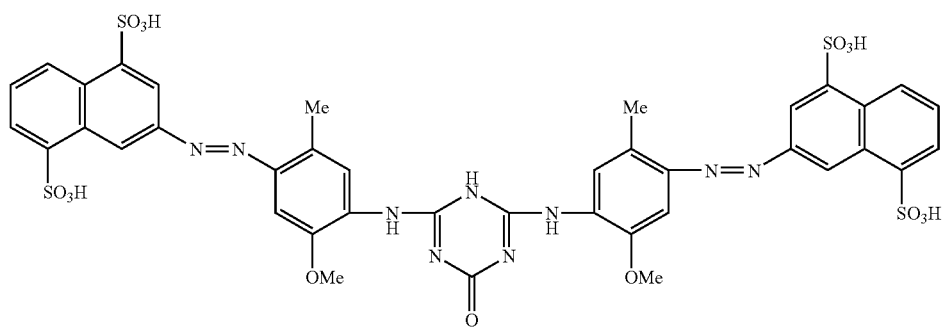

Formula A

-continued

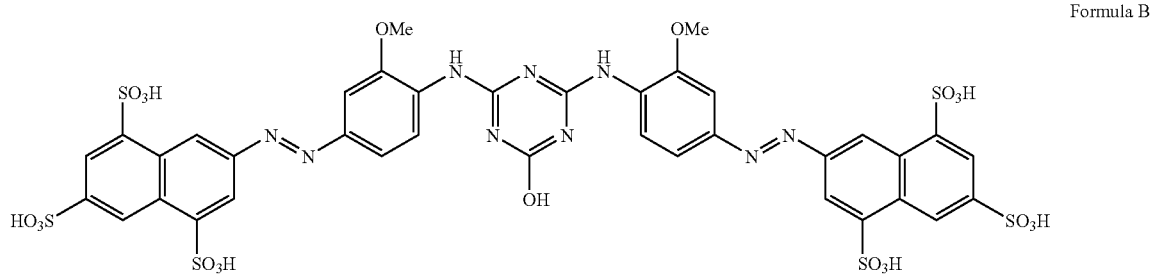

Formula B

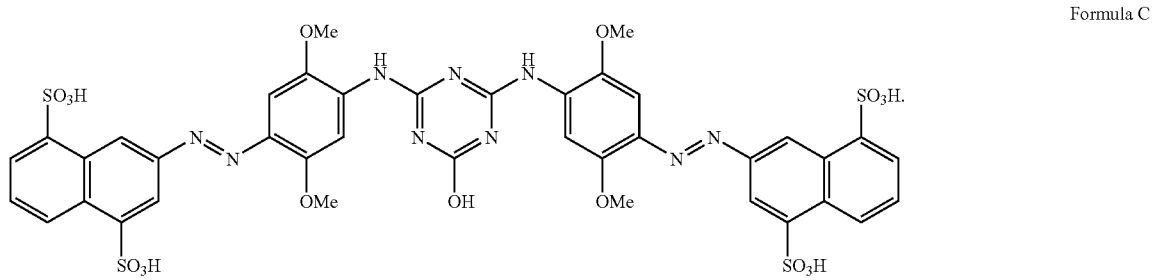

Formula C

12. An ink according to claim 11 wherein $R^5$ and $R^6$ are not both methoxy.

13. An ink according to claim 11 wherein:
$R^4$, $R^5$, $R^6$ and $R^7$ are each independently H, $C_{1-4}$-alkyl, $C_{1-4}$-alkoxy, carboxylic acid or $NHCONH_2$;
$R^1$ is H or $C_{1-4}$-alkyl;
$R^2$ and $R^3$ are each independently H or $C_{1-4}$-alkyl;
G and G' are each independently a sulfonic acid group, carboxylic acid group or phosphonic acid group;
n and m are each independently 1, 2 or 3; and
a and b are zero.

14. An ink according to claim 11 wherein the compound of Formula (1) or salt thereof has from 2 to 6 sulfonic acid groups.

15. An ink according to claim 11 wherein $R^5$ and/or $R^6$ is a carboxylic acid group.

16. An ink according to claim 11 wherein $R^1$ is H.

17. An ink according to claim 11 wherein the compound of Formula (1) or a salt thereof is of Formula (2) or salt thereof:

18. An ink according to claim 11 which has been filtered through a filter having an average pore size of less than 10 microns.

19. A substrate printed with an ink according to claim 11.

20. An ink jet printer cartridge comprising a chamber and an ink, wherein the ink is present in the chamber and said ink is according to claim 11.

21. An ink jet printer comprising a cartridge according to claim 20.

22. A process according to claim 1 wherein the compound of Formula (1) or salt thereof is a compound of Formula (2) or salt thereof

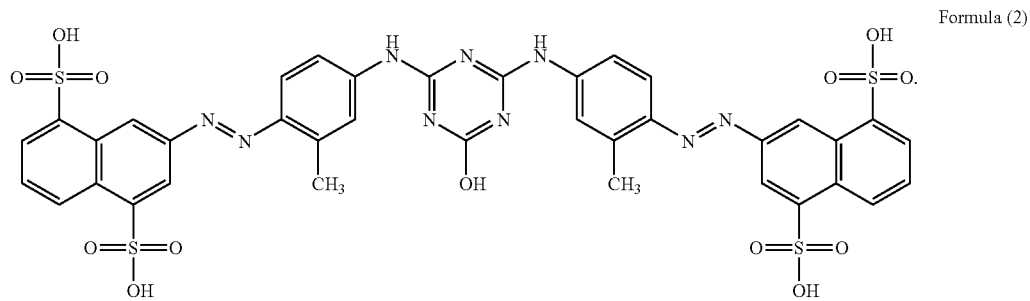

Formula (2)

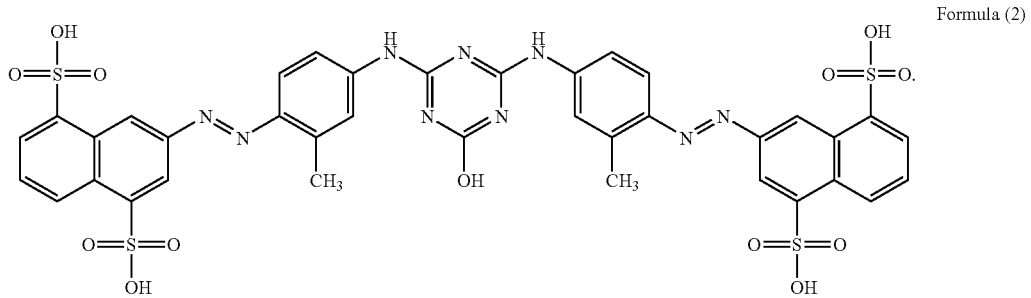
23. A compound of Formula (2) in the free acid or salt form:
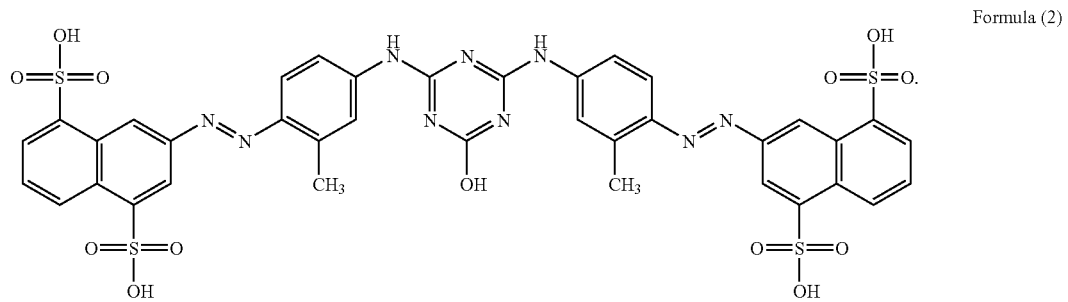
24. A compound according to claim 23 in the form of a metal salt selected from the group consisting of sodium and lithium salts.
* * * * *